Jan. 11, 1955     M. THOMPSON     2,698,956

POT LID WITH PUSH BUTTON OPERATED QUICK-DETACHABLE HANDLE

Filed Oct. 15, 1953     2 Sheets-Sheet 1

Inventor:
Murray Thompson
BY Dudley B. Howard
Attorney.

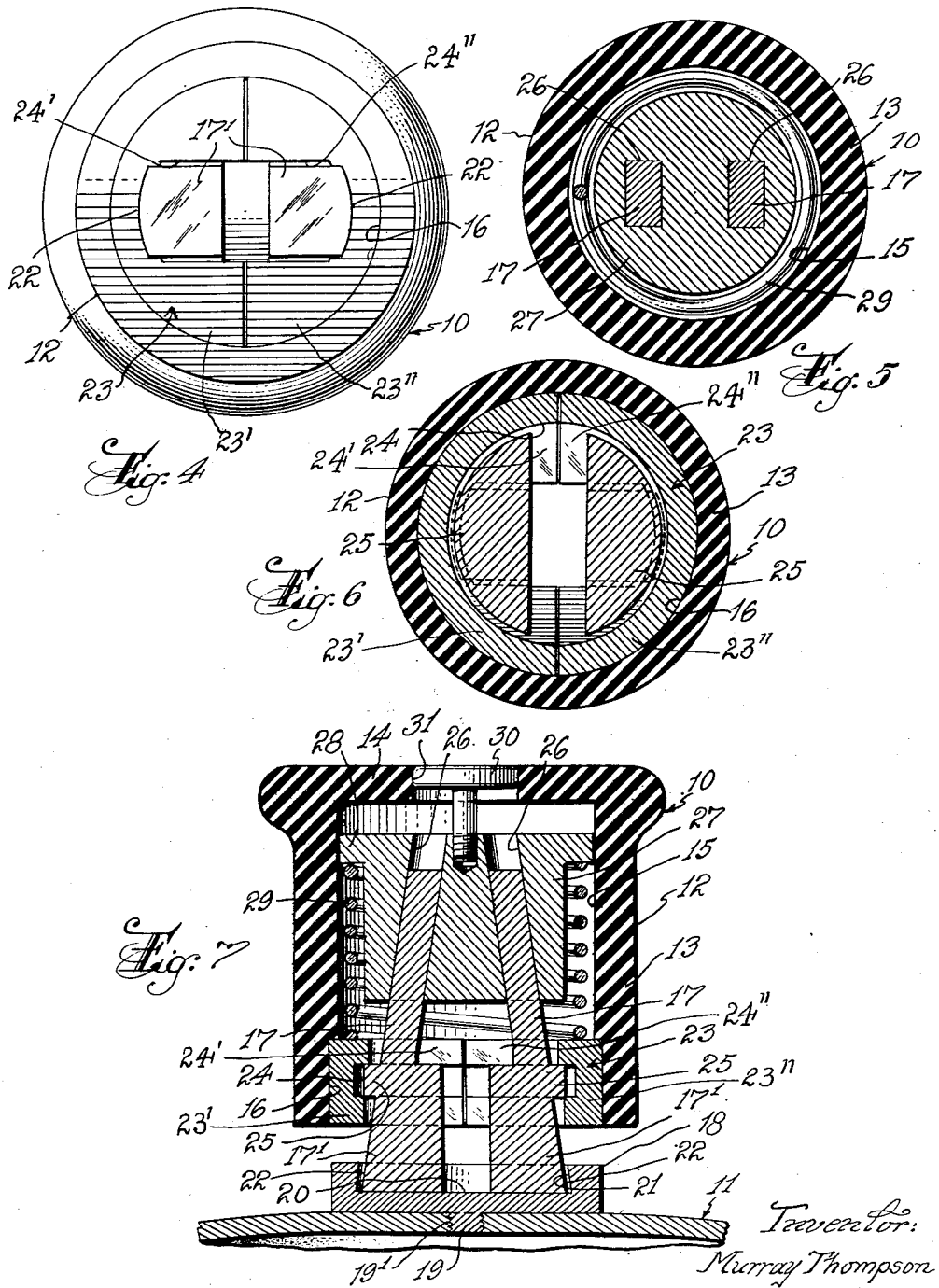

United States Patent Office 2,698,956
Patented Jan. 11, 1955

2,698,956

POT LID WITH PUSH BUTTON OPERATED QUICK-DETACHABLE HANDLE

Murray Thompson, New City, N. Y.

Application October 15, 1953, Serial No. 386,169

4 Claims. (Cl. 16—114)

The invention relates to cooking utensils and has particular reference to covered pots and pans.

Utensils of this kind are merchandised in matched sets of graduated diametrical body sizes. Each utensil body usually has a long handle projecting horizontally outward from a point close to its upper edge, or rim, so that it is entirely practicable to nest the bodies of any desired number of the utensils in a vertical stack for compact storage on the shelf of a kitchen cabinet when the utensils are not in use. Nesting of the lids of these idle utensils for the same useful purpose, however, is not practicable because they are very shallow and have bulky centrally located knoblike handles that project upward to a greater extent than the depth of the lid cavities, and these handles are permanently affixed. Consequently, it is the practice to unite each lid to its related utensil and then to suspend these separate units from a wall rack, or to place them on cabinet shelves in an arrangement that occupies many times the space that would be required if the utensil bodies and lids could be nested separately.

With the above-mentioned disadvantage of the permanently affixed pot lid handles in mind, it is the primary object of the present invention to provide cooking utensil lids with handles that are capable of instantaneous attachment and detachment so that the lids as well as their related utensils may be nested for economy of storage space. Of course, the detached handles must be put somewhere, but that is easily taken care of by depositing them in the uppermost utensil or lid of its respective stack or by laying them on the shelf alongside the stacked articles.

In accordance with the above object, the handle for each utensil lid has been provided with pushbutton-operated latching means to secure it to the lid in quickly attachable and detachable manner.

An ancillary object of the invention is to provide latching means of such simplified structure that its incorporation in the finger grip of a conventional pot lid handle will not materially enlarge the over-all size of the latter.

Figure 1:
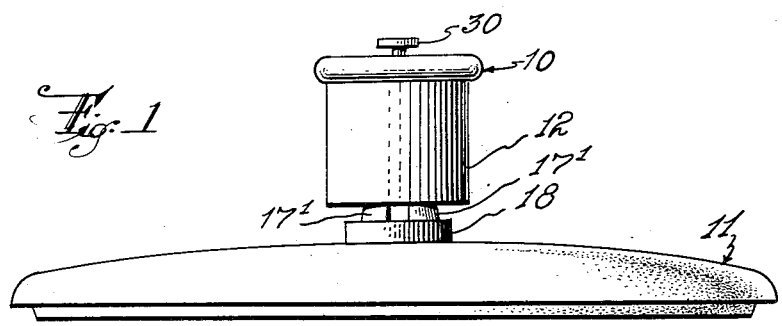
Figure 2:
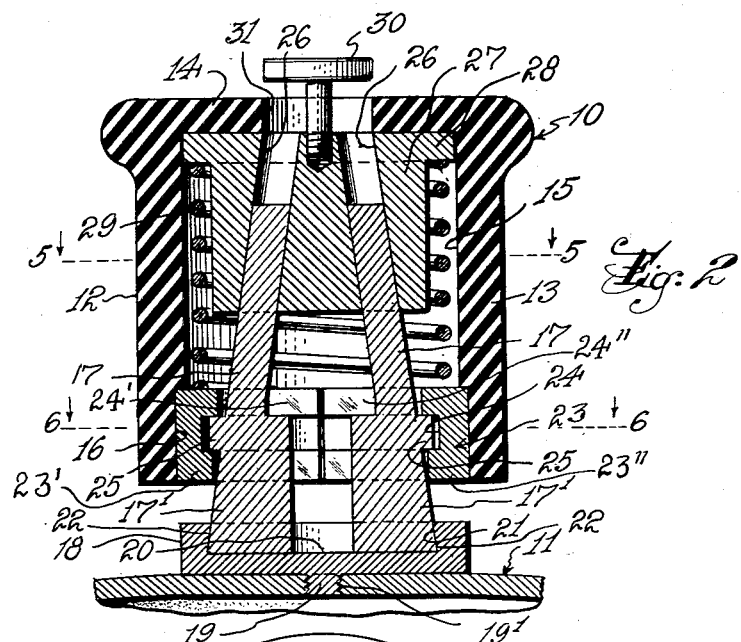
Figure 3:
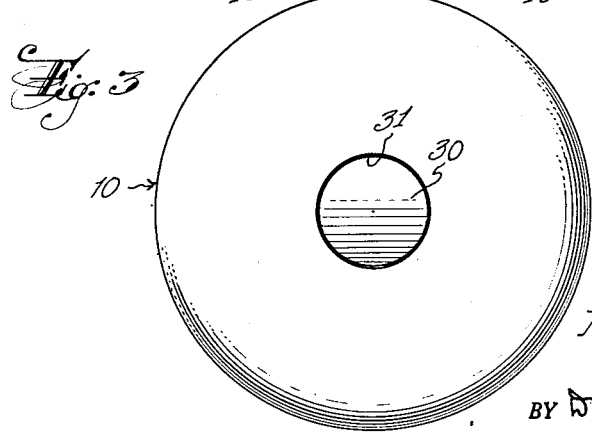

Other objects, advantages and features of the invention will become apparent as the following specific description is read in connection with the accompanying drawing, in which:

Fig. 1 is a side elevation of a utensil lid with handle attached; Fig. 2 is a vertical section of the same, showing the lid partially broken away; Fig. 3 is an enlarged detail plan view of the handle alone; Fig. 4 is a bottom plan view of the same; Fig. 5 is a horizontal cross-section on line 5—5 of Fig. 2; Fig. 6 is a similar view on line 6—6 of Fig. 2; and Fig. 7 is a sectional view similar to Fig. 2, showing the latching means in released condition.

Referring now in detail to the drawing, wherein like reference characters designate corresponding parts in the several views, the numeral 10 refers to the handle that is to be detachably engaged with utensil lid 11. This handle includes a finger grip 12 which is of substantially conventional size although necessarily somewhat enlarged vertically to accommodate the latching means to be described presently.

Finger grip 12 preferably is made of hard rubber and in the form of a thin-walled shell of circular cross-section having a side wall 13 and top wall 14 but being open at the bottom. The interior cavity 15 of finger grip 12 is cylindrical in concentric relation to the axis of the latter and has an enlarged lower end portion 16 of similar cross-sectional form.

The latching means by which handle 10 is attached removably to utensil lid 11 comprises three principal elements, viz: expansible and contractible male latch members 17 carried by finger grip 12 of said handle, a female latch member 18 relatively permanently affixed to the top of lid 11, and pushbutton-operated means to expand and contract the male latch members. There are preferably two male latch members 17 and they are in the general form of elongated prongs, which are arranged side by side in the interior cavity 15 of finger grip 12 of handle 10 in longitudinally extending relation to the latter with their lower ends, or jaws, 17' protruding from said finger grip for operative gripping engagement with female latch member 18 of lid 11.

Female latch member 18 preferably is in the form of a comparatively thin circular block which may be secured to lid 11 in any convenient manner but is shown in the illustrative example as having a depending central screwthreaded stud 19 for attaching engagement with a screwthreaded recess 19' in the upper face of said lid. An upwardly open socket 20 is provided in female latch member 18 to receive the lower ends, or jaws, 17' of male latch members 17 of handle 10. The side wall of socket 20 is undercut or downwardly diverging to form downwardly facing locking shoulders 21 for engagement by the correspondingly diverging upwardly facing locking shoulders 22 formed on the outer sides of the lower ends, or jaws, 17' of male latch members 17 when the latter are expanded into the latching condition represented in Fig. 2 of the drawing.

The operative movement of male latch members 17 in handle 10 is to be restricted to lateral rectilinear expansion and contraction only in an axial plane, so means is provided to permit the desired operative movement while positively locking the latch members against longitudinal movement in handle 10 at all times. The means which has been adopted for this purpose includes a split circular base member 23, composed of abutting complementary semi-circular sections 23'—23", which member preferably is secured by a pressed joint within the enlarged lower end portion 16 of the interior cavity 15 of finger grip 12. Base member 23 has a circumferential keyway 24 of varying effective radial depth in its inner face in which the semi-circular key flanges 25 that face outwardly from male latch members 17 are engaged for limited radial sliding movement. Sections 23'—23" of base member 23 have transversely aligned through guide slots 24'—24", respectively, in which male latch members 17—17 are slidably fitted for true coplanar radial translation during expansion and contraction. The greatly increased radial depth of keyway 24 adjoining the sides of guide slots 24'—24" is such that key flanges 25 of male latch members 17—17 cannot become disengaged therewith during contraction of said male latch members.

The upper end portions of male latch members 17 are parallel-sided and inclined radially inward in upward convergence with respect to the axis of finger grip 12 and are longitudinally slidable in correspondingly disposed through guide holes, or guideways, 26 provided in an actuating member 27 which is in the form of a block of circular cross-section mounted for longitudinal reciprocation in the interior cavity 15 of said finger grip. Throughout most of its length actuating member 27 is considerably smaller in outside diameter than interior cavity 15 of finger grip 12, but an annular flange 28 is provided at the upper end of said member 27 for bearing contact with the cylindrical inner side wall of cavity 15 to guide said member in its reciprocating movement. A helical retracting spring 29 is interposed between flange 28 of actuating member 27 and the upper face of base member 23 of the means that locks male latch members 17 against longitudinal movement in finger grip 12 under normal operating conditions. This spring maintains actuating member 27 normally in abutment against top wall 14 of finger grip 12, in which position male latch members 17 will be expanded to the degree of separation required to cause their locking shoulders, or jaws 22 to engage the mated locking shoulders 21 of female latch member 18 when handle 10 is seated on top of said female latch member as shown in Fig. 2. A centrally located pushbutton 30 projects upward from actuating member 27 and preferably is a separate part having screwthreaded connection with the latter. A through hole 31 is provided centrally in top wall 14 of finger grip 12 to permit pushbutton 30 to protrude above said finger grip in a position accessible for finger depression when it is desired to thrust actuating member 27 downward.

When pushbutton 30 is pressed downward into the position depicted in Fig. 7, actuating member 27 will draw male latch members 17 radially inward through guide slots 24'—24'' in base member 24 until their locking shoulders 22 clear the mated locking shoulders 21 of female latch member 18 sufficiently to permit disengagement of said male and female latch members.

With the exception of retracting spring 29, which preferably is made of steel, and finger grip 12, which has been specified as being preferably made of hard rubber, all other parts of handle 10 and lid-carried female latch member 18 should be made of aluminum to reduce weight to a minimum.

In applying handle 10 to a utensil lid 11, finger grip 12 of the former should be grasped securely and then pushbutton 30 should be depressed until male latch members 17 are contracted into the condition shown in Fig. 7. Then, the handle is lowered until male latch members 17 enter the socket in top of female latch member 18, whereupon pushbutton 30 may be released to permit spring 29 to retract actuating member 27 from the latch member contracting position of Fig. 7 into the position represented in Fig. 2, whereby the lower ends, or jaws, of the male latch members will move outward into engagement with female latch member 18 of lid 11 in the manner shown in said Fig. 2. To detach handle 10, pushbutton 30 is again depressed and said handle may be lifted from lid 11.

It will be understood that it is intended to cover all changes and modifications of the examples of the invention herein chosen for the purpose of illustration which do not constitute departures from the spirit and scope of the invention.

Having thus described the invention, I claim:

1. A cooking utensil device comprising: a utensil lid; a handle for said lid including a finger grip having a vertical cylindrical cavity opening through its lower end; and quickly operable and releasable means for attaching the handle to the lid, said attaching means including a female latch member provided on top of the lid and having an upwardly open socket with an undercut side wall forming downwardly diverging and facing locking shoulders, a pair of elongated male latch members mounted in the grip cavity of the handle in a lengthwise arrangement with their lower end portions projecting through the bottom opening thereof to form jaws, the said jaws of the male latch members having upwardly converging and facing shoulders on their outer sides to enter the socket of the female latch member and lockingly engage the correspondingly arranged oppositely facing shoulders thereof when said male latch members are expanded into operative positions; the upper end portions of the male latch members being parallel-sided and arranged at opposite sides of the finger grip cavity axis in downwardly diverging relation thereto, operating means for laterally expanding and contracting the male latch members consisting of an actuating member mounted for longitudinal reciprocation in the finger grip cavity and having downwardly diverging guide holes in which the upper end portions of said latch members are slidably fitted whereby depression of said actuating member will contract said latch members toward the cavity axis and upward movement will expand them, spring means biasing the actuating member upward toward latch member expanded position, and pushbutton means protruding from the actuating member through the top of the finger grip by which said member may be manually depressed; and means for locking the male latch members against longitudinal movement in the finger grip of the handle without obstructing lateral expansion and contraction.

2. A cooking utensil device as defined in claim 1, wherein the locking means for the male latch members includes structural means providing an annular inwardly open keyway in a plane perpendicular to the finger grip axis near its lower end, and radially outwardly projecting key flanges provided on the respective male latch members for engagement within the said keyway.

3. A cooking utensil device as defined in claim 2, wherein the structural means providing an annular inwardly open keyway is constituted by a circular base member mounted in the finger grip of the handle and having an inwardly opening circumferential keyway engaged by the key flanges of the male latch members, said base member being provided also with a transverse through guide slot in which the male latch members are fitted for true radial translation during expansion and contraction.

4. A cooking utensil device as defined in claim 3, wherein the circular base member is split into complementary abutting semi-circular sections in which the through guide slot for the male latch members is formed by transversely aligned slot sections in the respective base member sections.

References Cited in the file of this patent
UNITED STATES PATENTS

| | | |
|---|---|---|
| 819,441 | Lasher | May 1, 1906 |
| 2,494,159 | Bernstein | Jan. 10, 1950 |
| 2,598,568 | Lemetre | May 27, 1952 |